R. V. L. HARTLEY.
SYSTEM FOR AMPLIFYING ELECTRICAL ENERGY.
APPLICATION FILED JULY 8, 1914.
1,218,650.
Patented Mar. 13, 1917.
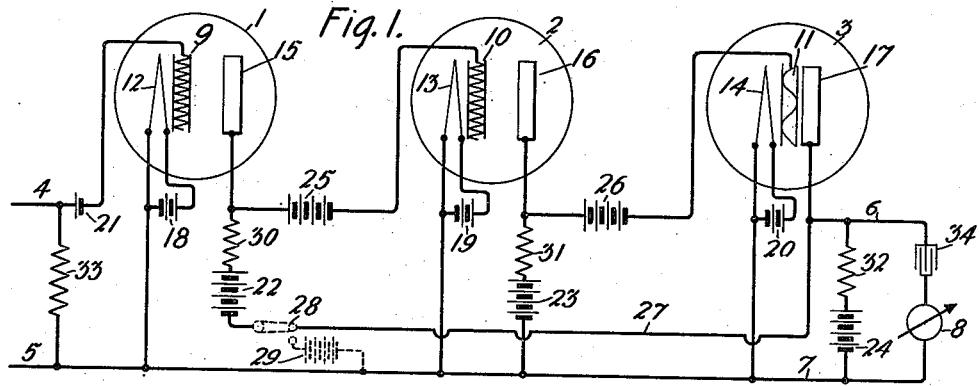
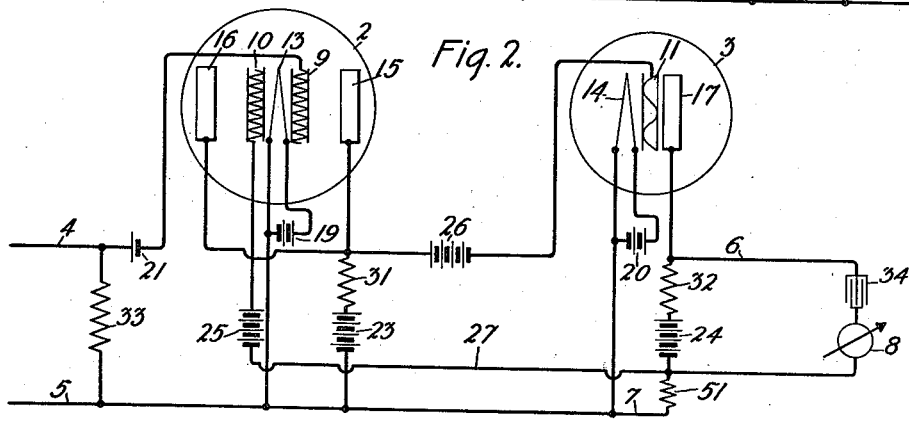
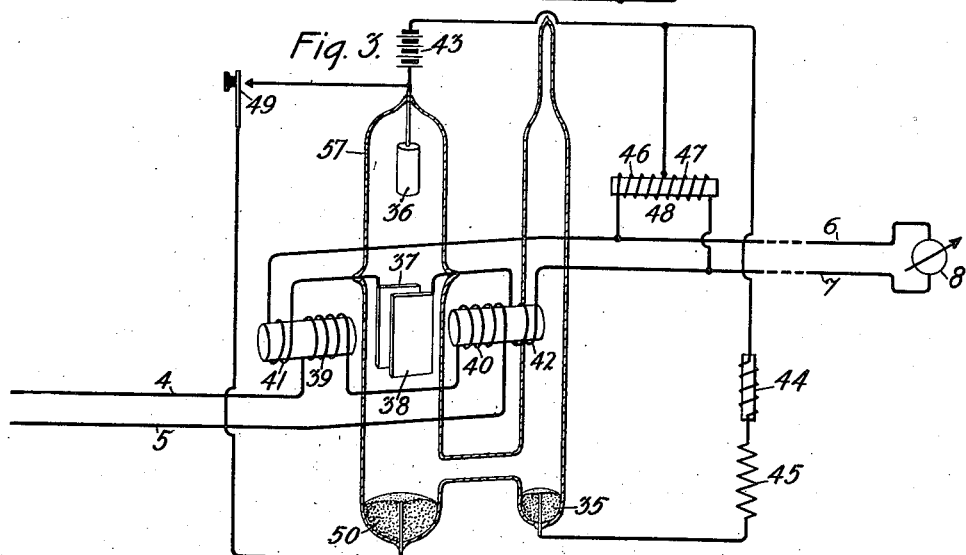
Witnesses:
O. D. M. Guthe
O. E. Rasmussen
Inventor:
Ralph V. L. Hartley.
by [signature] Atty.

UNITED STATES PATENT OFFICE.

RALPH V. L. HARTLEY, OF NEW YORK, N. Y., ASSIGNOR, BY MESNE ASSIGNMENTS, TO WESTERN ELECTRIC COMPANY, INCORPORATED, A CORPORATION OF NEW YORK.

SYSTEM FOR AMPLIFYING ELECTRICAL ENERGY.

1,218,650.      Specification of Letters Patent.      Patented Mar. 13, 1917.

Application filed July 8, 1914. Serial No. 849,669.

*To all whom it may concern:*

Be it known that I, RALPH V. L. HARTLEY, a citizen of the United States, residing at New York, in the county of New York and State of New York, have invented certain new and useful Improvements in Systems for Amplifying Electric Energy, of which the following is a full, clear, concise, and exact description.

This invention relates to amplifying repeaters. and its object is to increase the amplification of a repeater system beyond its normal capacity therefor. More particularly it relates to repeaters of a general type known as thermionic repeaters, having output electrodes in an evacuated vessel, such as the audion, also relates to the mercury arc repeater, and as applied thereto it is especially useful in amplifying alternating or fluctuating currents of very low frequency such as signaling currents transmitted over an ocean cable. It has been applied, for example, to audions connected in cascade formation as in the system of a patent to H. D. Arnold, Patent No. 1,129,924, March 2, 1915, and in certain respects is an improvement on the invention described therein. In general, however, the invention herein is not limited to any particular type of repeater nor to its application to repeaters working one into another in cascade formation, but is based in part upon a broadly new principle hereinafter explained in detail and which may be briefly stated as follows:

The energy amplification of a repeater system may be increased without "singing" by applying a fraction of the output energy thereof to the system to be amplified again, the fraction being less than the ratio of energy so applied to the additional output energy thereby developed, or, expressed in another way, less than the reciprocal of the amplification by the system of the energy so applied.

The application of this principle is of especial advantage where a series of two or more repeaters of a type exemplified by the audion are connected in cascade formation, and where it is desired that the system be directly connected between an incoming line and a receiving line or recorder without the use of transformers. With repeaters connected in cascade, a fractional part of the output energy of one of the repeaters may without the use of a transformer be applied in exact phase relation with the original input energy to a preceding repeater in the series, thus establishing a system in which two or more repeaters are working one into another in cyclic order. The system as a whole then becomes one that requires no transformers and is therefore especially applicable to direct currents or to low frequency alternating currents.

For any type of repeater the energy amplification is defined as the ratio of the available energy in the output circuit to the energy consumed in the input circuit. Thus, if unit energy applied to the input produces energy $a$ in the output, then $a$ is its amplification under normal conditions. Consider a repeater so constructed that any desired fraction of the energy in the output circuit can be applied to the input in such a way as to be amplified again into the output, but so as not to affect the circuit normally connected with the input. Let the fraction of the output energy thus fed back be given by $$\frac{r}{a}$$

where $r < 1$. Suppose unit energy applied to the input of such a repeater. An amount $a$ appears in the output. Of this $$\frac{r}{a} \times a = r$$

goes back to the input and $a-r$ is available. The energy $r$ fed back is amplified to $ar$ in the output. Of this $$\frac{r}{a} \times ar = r^2$$

returns to the input and $ar-r^2$ is available. The process continues as shown in the diagram.

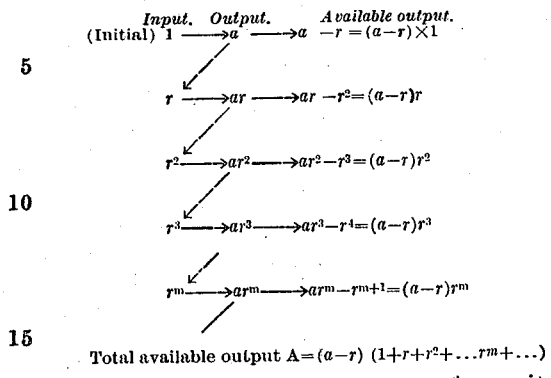

Total available output $A = (a-r)(1+r+r^2+\ldots r^m+\ldots)$

A, being the available output for unit input, is the amplification of the repeater under these conditions. Since $r<1$, $r^m$ approaches zero as $m$ increases, and the sum of the series in the second factor is finite. That is, a definite input energy causes a definite output, so that the amplification has a definite value. It can easily be shown that the sum of the series is $$\frac{1}{1-r}$$

so that $$A = \frac{a-r}{1-r}.$$

The amount by which the original amplification is multiplied or $$n = \frac{A}{a} = \frac{1-\dfrac{r}{a}}{1-r}.$$

$\dfrac{r}{a}$ is in general small compared with 1, since $r<1$, and $a$ is large for an efficient repeater. So by making $r$ very nearly one, $n$ may theoretically be made as large as we please.

In case $r$ be made equal to or greater than one, the above series becomes divergent, and its sum infinite. That means that once started, the output energy becomes independent of the input and continues increasing until checked by some other cause. It may happen in the case of alternating currents that for a given circuit the impedances are such as to make $r$ greater than one for a particular frequency or group of frequencies. The result is "singing" at some of those frequencies.

The conditions to be met in the application of the above principle are, first, the change produced in the output must be in the same direction as the change producing it, and second, the fraction of the output acting on the input must be under control, and if a wide range of frequencies is to be amplified without distortion it must be fairly constant over the range.

The first condition can be met with the audion or a repeater having similar characteristics, by the use of a second audion, preferably of the voltage transformer type, which when connected in series accomplishes the necessary change of phase for all frequencies. With the arc type of repeater an auxiliary magnet winding connected in the right direction will do the work.

With respect to the second condition it may be noted that the fraction of the energy fed back is a function of the impedance of the output circuit, which in turn is a function of the frequency. For work in which a narrow range of frequencies, whether high or low, is to be amplified, $r$ can be adjusted on the basis of the impedance at that range of frequencies, care being taken that it be not greater than 1 for any other frequency, so as to avoid accidental "singing."

The principle upon which the invention is based having been explained, it is obvious that a large number of different systems may be devised in accordance with it. Several of them will now be described by reference to the accompanying drawings wherein—

Figures 1 and 2 are diagrams of circuits using the audion, Fig. 1 showing three audions with a connection from the third for applying a part of the output energy to the input electrode of the second, and Fig. 2 showing two audions with a connection from the second for applying a part of the output energy to an auxiliary electrode of the first.

Fig. 3 is a diagram showing an application of the invention to a single repeater of the arc type.

The same characters are employed in the several figures to designate parts having like or similar functions.

Referring first to Fig. 1, three audions 1, 2, 3 are shown connected in cascade formation between conductors 4, 5 which may be connected to any source of current, such, for example, as an ocean cable, and conductors 6, 7 connected as shown to a receiving device 8 which may be, for example, a siphon recorder. Conductor 7 may be, as shown in Figs. 1 and 2, merely an extension of conductor 5. Audions 1 and 2 may serve as voltage amplifiers, stepping up any small voltage applied to the conductors 4, 5, and causing a relatively large change on the grid 11 of the third audion 3, which may be of a type having low output impedance and large output current. The several input electrodes or grids 9, 10 and 11 are preferably located close to the cathodes or filaments 12, 13 and 14, for efficient operation. The output electrodes or plates 15 and 16 of audions 1 and 2 may be, relatively to the grids, at a distance from the filaments, so as to provide for the operation of these audions as voltage amplifiers; while the plate 17 preferably is close to the filament of audion 3 to provide for large output current. The filaments are heated in any desired manner as by the batteries 18, 19 and 20. A small battery 21 may be included in one of the input conductors 4, and is preferably poled to make the grid 9 normally slightly negative. The proper normal space currents between the filaments and plates in the several audions are provided for by a system of batteries 22, 23 and 24, and the proper normal grid potentials, preferably slightly negative, for the audions 2 and 3 are provided for by the batteries 25 and 26.

The fractional part of the output energy of audion 3 is applied to the input electrode 10 of audion 2, by means of a conductor 27 joining the plate 17 of the former to the grid 10 of the latter.

A two-point switch or key 28, for testing purposes only, may be included in the conductor 27 and arranged so that current to the plate 15 of audion 1 and grid 10 of audion 2 may be supplied by a battery 29 joined directly to conductor 5—7. The flow of current in the several plate circuits through the resistances 30 and 31 provides potential differences for application to grids 10 and 11, respectively.

Resistance coil 33 having an impedance approximately that of the cable circuit may be shunted across the conductors 4, 5 to enable the incoming signaling currents to develop maximum voltage changes at the input electrode 9. A condenser 34 of large capacity, say 100 microfarads, may be connected in series with the recorder 8, thus providing a path of low impedance for the low frequency signaling currents without shunting direct current in the output circuit from the plate electrode 17. The resistance 32 is preferably in the form of a reactance coil to give it a high impedance to the output signaling currents.

When the key 28 is thrown down, the system operates normally, that is to say, as a simple cascade system in which the audion 1 receives energy from some source, such as a cable circuit, and works into audion 2, which in turn works into audion 3, which finally delivers its total output energy to the receiving line or device, such as the recorder 8. The potential of the battery 29 is adjusted to equal the potential drop between the plate 17 and filament 14 of the third audion. This provides that the alternate points of the key 28 are at the same potential, so that throwing the key upward to complete the connection of conductor 27 has no effect on the normal distribution of the currents. Now, however, any change in the space current of the third audion changes the voltage on the grid of the second audion, the change being in the same direction as that produced by the first audion on the second. The amount of this change can be regulated by means of the resistance 30, being greater for small values of 30 than for large. There is a critical minimum value of 30 corresponding to $r=1$, below which the system becomes unstable. By the addition of the connection 27 proportioned to apply a fraction of the output energy of the third audion back to the second, the total amplification of the system is greatly in excess of the amplification without that connection. The reason for using three audions (in Fig. 1) instead of two is to avoid connecting conductor 27 directly to the input circuit.

The same result may be secured by the system of Fig. 2 wherein but two audions are used. Here the audion 2 has two plates and two grids, the grid 9 being connected to the input conductor 4 and the grid 10 connected to the conductor 27. The output circuit of audion 3 includes a resistance or impedance 51 and the conductor 27 includes the battery 25 to impress the proper normal potential on the grid 10. By varying the resistance of 51, any desired fraction of the voltage change in the output circuit may be applied to the grid 10 in audion 2. The reason for using two separate grids in this audion is that if the output circuit of audion 3 were connected by conductor 27 back to the same grid 9 that receives the original input energy, then the impedance of 51 would be in shunt with the impedance 33 normally connected across the input circuit of audion 2. In certain cases it is desirable that the impedance across the input circuit be as large or larger than that of the output circuit (i. e. the circuit of the recorder 8). This would, of course, be impossible if a small fraction of the output impedance of audion 3 were shunted across the input circuit of audion 2.

In Fig. 3 is represented a mercury arc repeater system. An ionized arc stream flows between the cathode 35 and anode 36 inclosed in a vessel 57. This stream passes between two auxiliary output electrodes 37, 38. A magnet system for variably deflecting the stream comprises a pair of windings 39, 40 in the circuit of the input conductors 4, 5 and an auxiliary pair of windings 41, 42 connected in the output circuit, which includes also the two electrodes 37, 38, the space between them through the ionized stream and the output conductors 6, 7 leading to a receiving line or device, such as the recorder 8. A battery 43 supplies current through the reactance coil 44 and resistance 45 to maintain the arc stream and also supplies current through the two halves 46, 47 of the impedance coil 48 to the electrodes 37 and 38, respectively. The switch 49 is used in a well-known way to start the arc between the cathode 35 and anode 36 by first establishing one between the cathode 35 and the starting anode 50. Without the windings 41 and 42 the repeater works with a certain amplification depending on the constants of the apparatus and system, but by adding the windings 41, 42, properly proportioned to apply a small fraction of the output energy to the input magnet system, and connecting these windings so that the current in them is in the same direction as that in the windings 39 and 40, the amplifying power of the repeater is greatly increased.

What is claimed is:

1. The combination with a plurality of thermionic repeaters, working one into another in cascade formation, of a connection between one of said repeaters and a preceding repeater in the series adapted to apply to the input circuit of the latter a part of the output energy of the former.

2. In a system for amplifying electric energy, the combination with a plurality of thermionic repeaters, working one into another in cascade formation, of a divided output circuit for one of said repeaters, one of the parts of said circuit leading to a preceding repeater in the series and adapted to apply a part of the energy of the former repeater to the latter.

3. A system for amplifying electric energy comprising a series of thermionic repeaters, working one into another in cascade formation, of a connection between one of said repeaters and a preceding repeater in the series, the said connection being adapted to apply to the latter repeater a fraction of the output energy of the former, the fraction being less than the ratio of energy so applied to the additional energy thereby developed.

4. A system for amplifying electric energy comprising two thermionic repeaters, one working into the other, of a connection between the latter repeater and the former, said connection being adapted to apply to the said former repeater a fraction of the output energy of the latter, the fraction being less than the ratio of energy so applied to the additional energy, thereby developed.

5. A system for amplifying electric energy comprising two thermionic repeaters, each working into the other.

6. A system for amplifying electric energy comprising a plurality of thermionic repeaters, each working into another in cyclic order.

7. A system for amplifying electric energy comprising a plurality of thermionic repeaters, each working into another in cyclic order, and means whereby one of said repeaters can apply a part only of its energy to the next repeater in order.

8. A system for amplifying electric energy comprising a plurality of thermionic repeaters, each working into another in cyclic order, and a receiving circuit connected to one of said repeaters and adapted to utilize a part only of its output energy.

9. A system for amplifying electric energy comprising a plurality of thermionic repeaters, each working into another in cyclic order, an input circuit connected to one of said repeaters and a receiving circuit connected to another of said repeaters.

10. A system for amplifying electric energy comprising two thermionic repeaters each working into the other, and means for limiting the energy applied by one of said repeaters to the other, whereby the first mentioned repeater can apply a part only of its energy to the other.

11. A system for amplifying electric energy comprising two thermionic repeaters, a connection from one of said repeaters to the other adapted to apply the energy of the former with full force to the latter, and a connection from the latter repeater to the former adapted to apply a part only of the energy of the latter to the former.

12. A system for amplifying electric energy comprising a plurality of repeaters, each having input and output electrodes in an evacuated vessel, and connections between each of said repeaters and another in cyclic order, each of said connections extending from the output electrode of the one repeater to the input electrode of the next in order.

13. A system for amplifying electric energy comprising two audions in tandem, a connection between the output electrode of one of said audions to the input electrode of the other, a connection between the output electrode of the latter repeater to the input electrode of the former, and means adapted to limit the energy applied through the last mentioned connection to the first of said audions.

14. A system for amplifying electric energy comprising a plurality of repeaters, working one into another in cascade formation, and an input circuit working into the system, of a connection between one of said repeaters and a preceding repeater in the series, and means, unattached to said input circuit, adapted to limit the supply of energy from the former repeater through the said connection to the latter repeater.

15. In a system for amplifying electric energy, the combination with an input circuit and two repeaters, each comprising input and output members, one of said repeaters having its input member connected to said input circuit and its output member connected to the input member of the other repeater, of an auxiliary input member for the first mentioned repeater, and a connection between the output member of the last mentioned repeater and the said auxiliary input member of the first mentioned repeater.

16. In a system for amplifying electric energy, the combination with an input circuit and two audions, each comprising input and output electrodes, one of said audions having its input electrode connected to said input circuit and its output electrode connected to the input electrode of the other audion, of an auxiliary input electrode for the first mentioned audion, and a connection between the output electrode of the last mentioned audion and the said auxiliary input electrode of the first mentioned audion.

In witness whereof, I hereunto subscribe my name this 6th day of July, A. D. 1914.

RALPH V. L. HARTLEY.

Witnesses:
K. L. STAHL,
W. F. HOFFMAN.